Oct. 20, 1970  W. H. BAUER  3,535,273

METHOD OF TREATING CELLULAR FOAM RESINS

Filed Sept. 19, 1967

INVENTOR
William H. Bauer
BY
Wolf, Greenfield & Hieken

United States Patent Office 3,535,273
Patented Oct. 20, 1970

3,535,273
METHOD OF TREATING CELLULAR FOAM RESINS
William H. Bauer, Medway, Mass., assignor to Filfast Corporation, Holliston, Mass.
Continuation-in-part of application Ser. No. 582,486, Sept. 28, 1966. This application Sept. 19, 1967, Ser. No. 668,880
Int. Cl. C08j 1/30
U.S. Cl. 260—2.5
14 Claims

ABSTRACT OF THE DISCLOSURE

An improved method of treating cellular foam resins is provided to rapidly and efficiently break cell walls within a foamed urea-formaldehyde resin mass and convert the foamed resin mass to a substantially open cell mass and/or to wash cell walls of a foamed resin mass to remove undesirable impurities. The method of this invention is particularly advantageous for use in treating urea-formaldehyde foam resins for ultimate use in the floral field as flower bases where it is desirable to wash cell walls of the mass to remove deposits of substances which form during manufacture and which are harmful to fresh cut flowers.

RELATED APPLICATIONS

This application is a continuation-in-part of co-pending United States patent application Ser. No. 582,486 filed Sept. 28, 1966 entitled Method of Treating Cellular Foam Resins, now abandoned.

BACKGROUND OF THE INVENTION

The use of acid catalyzed aldehyde condensation foam resins such as urea-formaldehyde foam as bases for supporting fresh cut flowers in floral displays is well-known. Such bases prevent wilting and keep the flowers fresh for long periods of time. It is important in such bases that sufficient water be available for absorption by the flowers through their stems to keep the flowers fresh. Urea-formaldehyde foam is particularly useful for this purpose in view of its relatively low cost and frangible nature which permits ease of insertion of a flower stem into a cellular foamed mass in a number of different original arrangements as desired.

Certain problems have arisen in the use of urea-formaldehyde foam resins for floral purposes. Most methods of manufacture known to the art result in initial formation of a foam cellular mass which has a large percentage of closed discrete cells or cells having openings so small as to prevent entrance and free passage of water throughout the mass. This results in difficulty in washing unwanted by-products from the cells and cell walls of the foam mass. If such unwanted by-products are not removed, often wilting and other damage to the flowers results. Moreover, if water cannot pass freely through the mass, considerable time is wasted in filling the mass with water prior to positioning of the flowers and the availability of water once positioned in the foam is limited insofar as absorption by the stems.

Various methods have been used in the past to break cell walls of closed cell foams such as urea-formaldehyde to increase water absorbency. Such methods include coating of the surfaces of the mass with a wetting agent adapted to carry water into the interior of the mass, compacting of the mass beyond its elastic limit to break cell walls and various other treatments. Such treatments often are expensive, difficult to carry out and/or result in insufficient breakage of the cell walls or disintegration thereof which is undesirable.

SUMMARY OF THE INVENTION

According to the invention, a self-supporting mass of urea-formaldehyde foam comprising a plurality of closed, non-interconnecting cells has a surface which is subjected to a hot fluid substantially nonreactive with the foam to cause the fluid to pass into the foam. The fluid is heated to a temperature above 150° F. and below the decomposition temperature of the foam. Preferably the fluid is water heated to a temperature below its boiling point, i.e., 212° F. and above 180° F. If it is desired to break cell walls, the water is sprayed preferably onto the top surface of a mass and allowed to pass downwardly through the foam from the top surface to open a substantial percentage of formerly closed cells within the mass, i.e., cell walls are ruptured changing the nature of the foam mass to a substantially opened or interconnecting cellular foam mass. However, a foam mass having open cells can also be treated with the hot water treatment of this invention to thoroughly wash the cells and cell walls to remove unwanted by-products when the mass is previously treated to open cell walls.

Preferably after the hot liquid treatment, the foam mass while still hot is compacted to remove a substantial percentage of the washing liquid.

The method of this invention can be carried out using relatively inexpensive mass production techniques and with minimized time to enable high production rates of cellular foam resin masses usable for floral purposes.

Preferably, in accordance with this invention, urea-formaldehyde foam is subject to the hot water treatment shortly after formation of the foam following neutralization of the acid catalyzed foam while the foam mass is still hot and wet as a result of polymerization thereof. Such wet, hot foam masses cannot ordinarily be washed easily internally. If immersed in a liquid such as water, the water does not penetrate into the innermost cells of the mass probably due to the closed cell nature of the foam and/or extremely narrow passageways interconnecting open portions of the foam. By the use of the hot water treatment, it is possible to easily wash the cell walls of such foam without drying the foam first. Water or other nonreactive liquids can rapidly penetrate into the innermost walls of the mass and act as a solvent or vehicle for by-products of the preliminary reaction and other unwanted materials in the cells including the plastic material in or on the cell walls which unwanted material can be rapidly washed away from the foam mass. When the treatment is carried out immediately after neutralization, closed cells of the foam mass have their cells ruptured while if the treatment is carried out after rupture of the cell walls, additional cleansing of the cell walls is accomplished.

BRIEF DESCRIPTION OF THE DRAWINGS

The above and other features and advantages of the present invention will be better understood from the following specification when read in connection with the accompanying drawings in which.

BRIEF DESCRIPTION OF PREFERRED EMBODIMENTS

Figure 1:
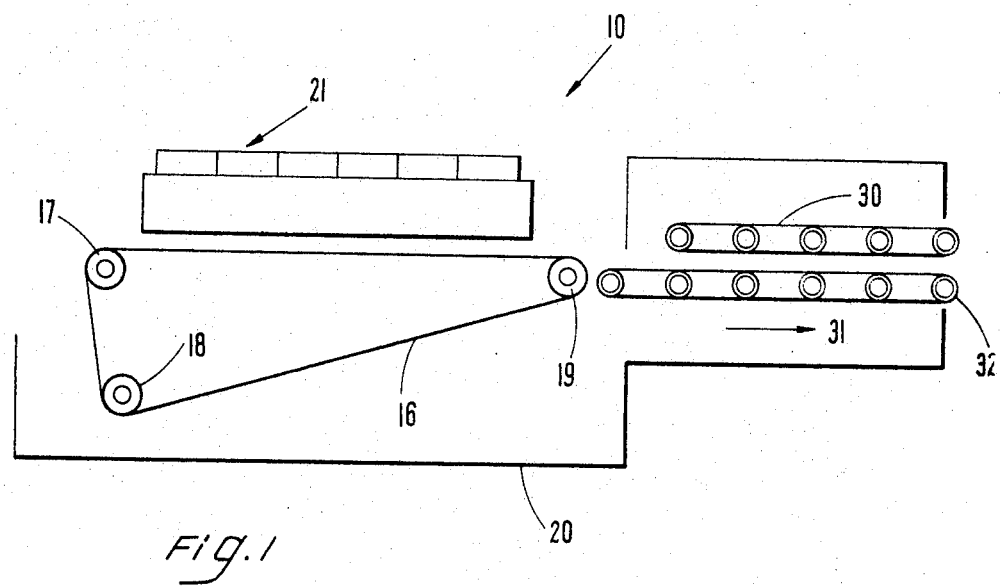
FIG. 1 is a semi-diagrammatic side view illustrating apparatus useful in the method of this invention.

Urea-formaldehyde foam can be prepared according to any of the known procedures before treatment in accordance with this invention. For example, as described in U.S. Pat. No. 3,284,379 issued Nov. 8, 1966, a continuous system for the production of urea-formaldehyde foam can be used. In this known system, urea-formaldehyde resin, water and a wetting agent are added to a tank and thoroughly mixed by a conventional mixer. Air is incorporated into the resin mixture and the air-resin mixture passed through an extender for thoroughly mixing the liquid resin with air to form a foam. A specific extender can comprise an elongated cylindrical housing having a series of perforated discs maintained in spaced longitudinal alignment by oval spacers. The discs have varying numbers of openings or passageways for providing a tortuous passage for the resin mixture and air to assure foam formation due to turbulence.

After formation of the foam, an acid catalyst is introduced into the foam mixture to form a reaction mixture which is thoroughly mixed in a blender to blend the catalyst with the resin foam. The resin mixture is extruded through an extrusion orifice using fluid pressure supplied through a single continuous system from the resin-water-wetting agent tank.

Upon extrusion of the reaction mixture, an acid catalyzed reaction takes place which cures the resin into a cellular foam mass to form a water-saturated, self-supporting, frangible structure having a density when dried of from 0.1 to 12 pounds per cubic foot depending upon the amount of air, resin and other conditions used. Normally, excess amounts of acid are used to assure rapid curing and set up of the foam. In accordance with known procedures, the extruded foam having a large quantity of water therein and often from about 40% up to 90% by weight is neutralized either by contact with a basic liquid, such as ammonium hydroxide, or a basic gas such as ammonia.

Preferably the basic gas neutralizes the excess catalyst resulting in a cured self-supporting foam mass having both opened and closed cells. The resin of the cell walls of the foam at this point usually contains water intermixed with wetting agent, residual low viscosity resin and reaction products of the acid catalyzed polymerization reaction and the neutralization step while the cells usually contain a mixture of water vapor and other gases. The production of foam as described above is known and is not claimed as inventive in this application.

The neutralized cured foam produced as described above cannot rapidly and efficiently be washed to remove unwanted by-products and impurities which would be harmful to fresh flowers. It has been found that in some cases, if the foam is dried, opening of some of the closed cells thereof occurs permitting washing. Removal of harmful chemicals, however, is not ordinarily complete even if conventional washing is carried out as by allowing the foam to absorb water and permitting the water to drain or placing the foam in a drying oven. Drying before washing to open cells of a resin foam mass is extremely time consuming and weakens the foam structure. Drying can be eliminated by the use of the hot water step treatment of this invention.

Preferably, the urea-formaldehyde foam mass produced as above described is treated by placing it under a hot water spray while the mass remains heated to approximately 110° F. but within the range of from 60° F. to 130° F. preferably due to the heat of the polymerization reaction. When hot water is sprayed over the surface of such a mass, surprisingly it is found that the water passes through the upper surface and downwardly through the mass, thus opening and enlarging communication passageways between the cells of the mass. Preferably the heat of the sprayed water is in the range of from 150° F. to 212° F. but always below the decomposition temperature of the foam and acts to cause expansion within closed cells of the mass and thus rupture cell walls placing the cells in communication with each other.

Figure 2:
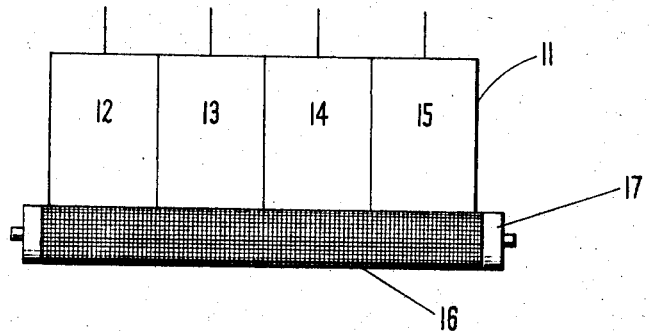
FIG. 2 is a front view thereof.

Preferably the process is carried out by passing a plurality of blocks of cellular foam through an apparatus of the type shown in FIGS. 1 and 2. The apparatus 10 comprises a top casing 11 defining elongated channels 12, 13, 14 and 15 each dimensioned to closely surround blocks of cellular foam which are carried through each channel seriatim by an endless belt 16 mounted on rolls 17, 18 and 19. The endless belt is perforated to allow water to drop through to a collection vessel 20. Above each channel 12–15 is located a series of aligned water spraying nozzles as shown by the series indicated at 21. Thus, as each block passes along its channel, hot water as described above is sprayed downwardly over the top surface of the block, passes therethrough and is collected in the collection vessel 20 as the block moves along the endless belt 16. After passage through channels 12, 13, 14 and 15, the blocks are dropped onto a squeeze roll assembly 30 shown in FIG. 2 which can be of a conventional nature. The squeeze roll assembly carries the blocks in the direction of arrow 31 to a collection zone for packing. Preferably the squeeze roll assembly squeezes the blocks to at least ½ of their normal height to remove residual water after the treatment of this invention. Surprisingly, the blocks when heated by the water are warm enough to permit squeezing without further breakage of cell walls in the mass while permitting removal of the sprayed water or other liquid which can drop to a suitable collection zone. Preferably the hot liquid is sprayed over the top surface of the blocks for a period of time no longer than about 5 minutes. If the period of time of exposure to the hot water spray is increased, no substantial benefits are obtained.

While it is preferred to treat the foam mass as soon as it is neutralized, substantially cured into a self-supporting mass, while it still retains some of the heat of reaction and is saturated with an aqueous solution, the treatment with hot liquid can be carried out as other stages of manufacture. For example, it may be possible to open the cell walls by treating with a hot liquid prior to neutralization and directly after the foam mass cures to a self-supporting structure. In addition, the hot water treatment can be carried out after the cell walls are opened by other means. In this case, the hot water merely acts to wash unwanted by-products from the cells of the urea-formaldehyde foam.

In all cases, it is preferred that at least some areas of the surface of the mass be left exposed to the atmosphere or not covered with a heated liquid since it has been found that passage of the heated liquid to the block is impeded when the liquid covers all surfaces as by immersion of the mass below the level of a heated liquid.

While hot water is preferred as the treating fluid in the process of this invention, other fluids such as steam can be used. For example, in some cases steam, at a temperature in the range of from about 212° F. to below the decomposition temperature of the foam but preferably to about 260° F., can be used. The steam can be directed at a surface of the foam under pressures ranging from 15 p.s.i. to 800 p.s.i. or higher so long as the structure of the foam is not destroyed.

In a specific example of producing treated urea-formaldehyde foam masses according to this invention, 150 gallons of a partially cured urea-formaldehyde resin in ratio of 1½–2 formaldehyde to 1 urea with a solids content of 66%, is mixed with 110 gallons of water. The resin-water solution is preferably adjusted by variation in the amount of water so that the final mixture has a viscosity of approximately 19 as read on a model LVF Brookfield viscometer (Synchro-Lectric viscometer). 2½ gallons of the wetting agents such as a mixture of alkyl-trimethyl ammonium chloride 50% and isopropanol 50% wherein the alkyl constituent is derived from soya oil fatty acids are added to the resin water mixture. Preferably the temperature of the mixture is maintained between 90 and 95° F. although variations are possible.

After mixture of the ingredients, the mixture is passed through a fluid pump under a fluid pressure of approximately 120 pounds per square inch and air is admitted to the mixture through an air line under a pressure of 140 to 150 pounds per square inch. The air-resin mixture is foamed in an extruder as previously described to form a uniform foam and then passes through a second mixing tube by the fluid pressure after addition of 75% phosphoric acid aqueous solution. The phosphoric acid catalyst is metered into the system at a constant rate with a total of approximately 45 pounds of the 75% solution of phosphoric acid employed. The wet catalyzed foam is extruded through a nozzle into rectangular block molds forming blocks having a length of approximately 9 inches, a depth of 3 inches and a width of 4 inches.

The wet urea-formaldehyde foam issuing from the nozzle of the extruder has a wet density of 3.6 grams per cubic centimeter and a pH of approximately 2.5. The foam, if dried, has a large number of opened interconnecting cells but, a number of these cells have only small interconnecting openings which impede the passage of water and in addition, there are a number of closed non-interconnecting cells present in the foam. When wet after issuing from the nozzle, the foam is a substantially closed cell.

Curing of the blocks is allowed to proceed until they reach a point where, while still wet, they are self-supporting. The blocks are then placed in an ammonia atmosphere to raise the pH to a pH of from about 7 to about 11.

At this point, a batch of still wet bricks, saturated to within 40 to 90% of their weight, at a temperature of about 110° F. are consecutively placed in side by side relationship on a conveyor belt such as 16 open to standard room atmosphere. The blocks are passed through the guide channels 12–15 which are 4.01 inches square and 12 feet long with sufficient ½ inch opening nozzles from the system 21 to allow each block to absorb at least 2 quarts of water as 72 blocks per minute pass over belt 16 in chambers 12–15. Thus, each block should absorb at least 10 times its weight of water. The water is passed to the nozzles at a temperature of 200° F. After the hot water treatment, the blocks, at a temperature of 160° F., pass hrough a squeeze roller assembly as at 30 where they are squeezed to a thickness of approximately ⅜ inch and then released at end 32 whereupon they return to substantially their original dimensions. It is found that the hot water treatment has opened the cell walls of the blocks to the extent that the blocks can be immersed in water or other liquids to substantially fill and wash all the cells thereof rapidly. The water within the cells left by the spray or the washing step can be removed easily by inverting the blocks and shaking them or with the use of a blotter. The hot water itself removes many of the unwanted materials from the blocks as it passes into the top surface and out through the blocks. When such blocks are placed in a tank of water, they will absorb water to complete saturation in approximately 10 seconds and sink as rapidly as blocks which have been allowed to completely dry. On the other hand, when wet blocks are produced as described above with the omission of the hot water treating step, the wet blocks do not absorb additional water readily and will in fact float for long periods of time if placed in water.

While a hot water spray is preferred for treating a single surface of a foam mass in accordance with this invention, it is also possible to treat one surface of the block by exposure to a hot fluid as by flowing hot water directly onto the surface. It is preferred that an upper surface of the block be treated with hot water since it is believed that the force of gravity pulling downwardly on the water tends to aid the hot water in passing through the cellular foam mass. While the temperature of the foam blocks above-described is preferably about 110° F. prior to exposure to the hot water treatment, the temperature can vary greatly usually from room temperature to below the temperature of the hot water treating agent. If the block is initially below about 110° F., the time required to open the cells is increased slightly. When heated water vapor, i.e., steam, is used in place of water, it is preferably passed over the top surface of the foam mass and forced into the blocks under pressure. The resultant opening of cell walls is comparable to that obtained with the use of hot water.

It should be understood that the hot water treatment of this invention is useful even if some or substantially all of the cell walls of a foam mass have previously been opened either during the polymerization and foam formation stage or thereafter. Thus, open cell urea-formaldehyde foam can be passed through the apparatus 10. The hot water washes the cell walls as previously described and the heat produced is important to allow squeezing to remove substantial quantities of water and allow packing and shipping immediately after removal from the squeeze roll assembly. In all cases the foam mass is sufficiently raised in temperature and preferably to a temperature of at least 120° F. so that it becomes resilient and can be compressed within its elastic limit while hot, to remove the water or other washing agent.

While specific embodiments of this invention have been shown and described, it should be understood that many variations thereof are possible. While a specific urea-formaldehyde formulation has been described, various additives to the foam may also be used in accordance with known practice including surface active agents such as wetting agents, fillers and in some cases, pigments and dyes.

What is claimed is:

1. A method of treating a self-supporting mass of a urea-formaldehyde foam comprising a plurality of non-interconnecting closed cells, said method comprising subjecting a surface of said foam to a hot aqueous fluid substantially nonreactive with said foam, under conditions which permit said aqueous fluid to pass into said foam,
    said aqueous fluid being heated to a temperature in the range of from 150° F. to below the decomposition temperature of said foam whereby cell walls of said foam are ruptured.

2. A method in accordance with the method of claim 1 wherein said fluid is water and said water is passed to said foam for a period of no longer than five minutes.

3. A method in accordance with the method of claim 1 wherein said fluid is water heated to a temperature of from 150° F. to 212° F. and is applied to said foam by spraying from above the top surface of said foamed resin.

4. A method in accordance with the method of claim 3 wherein said foam is cured and heated to a temperature of about 110° F. prior to subjecting said surface with said hot fluid.

5. A method in accordance with the method of claim 3 and further comprising treating said foam after first neutralizing said foam and while it is formed as a self-supporting, wet mass retaining its heat of polymerization.

6. A method in accordance with the method of claim 2 and further comprising causing said foam to absorb at least 10 times its weight of water allowing said water to drain from said foam and washing the resultant substantially open cell foam to remove unwanted materials from the cell walls thereof.

7. A method in accordance with the method of claim 1 wherein said fluid is steam heated to a temperature in the range of from about 212° F. to 260° F. and is applied to said foam at a pressue of at least 15 p.s.i.

8. A method in accordance with the method of claim 1 and further comprising resiliently compressing said foam while it retains heat derived from said hot aqueous fluid and permitting said foam to return to its original shape thereby removing excess fluid therefrom.

9. A method in accordance with the method of claim 8 wherein said foam is compressed by more than ½ of its original thickness.

10. A method of treating a self-supporting mass of an acid catalyzed aldehyde condensation resin foam comprising a plurality of cells, said method comprising subjecting a surface of said foam to a hot aqueous fluid substantially nonreactive with said foam and permitting said fluid to pass into and completely fill cells of said foam, said fluid being heated to a temperature in the range of from 150° F. to the decomposition temperature of said foam, and subsequently compressing said foam while it retains heat imparted by said liquid and allowing said foam to resiliently expand after said compression step whereby a substantial proportion of said fluid is forced out of said foam.

11. A method in accordance with the method of claim 3 and further comprising resiliently compressing said foam while it retains heat derived from said hot aqueous fluid and permitting said foam to return to its original shape thereby removing excess fluid therefrom.

12. A method in accordance with the method of claim 11 wherein said foam is compressed by more than ½ of its original thickness.

13. A method in accordance with the method of claim 9 wherein said foam is caused to absorb at least ten times its weight of water prior to said compressing.

14. A method in accordance with the method of claim 10 wherein said aqueous fluid is water at a temperature in the range of from 150° F. to 212° F.

References Cited

UNITED STATES PATENTS

| 2,753,277 | 7/1956 | Smithers | 260—2.5 |
|---|---|---|---|
| 3,063,953 | 11/1962 | Eberl et al. | |
| 3,290,260 | 12/1966 | Buccigross. | |

MURRAY TILLMAN, Primary Examiner

M. FOELAK, Assistant Examiner

U.S. Cl. X.R.

47—41.12; 260—71